(12) United States Patent
Cathey (10) Patent No.: US 7,812,728 B2
(45) Date of Patent: *Oct. 12, 2010

(54) METHODS AND APPARATUSES FOR RADIO FREQUENCY IDENTIFICATION (RFID) TAGS CONFIGURED TO ALLOW ANTENNA TRIM

(75) Inventor: David A. Cathey, Eagle, ID (US)

(73) Assignee: Round Rock Research, LLC, Mount Kisco, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 11/845,308

(22) Filed: Aug. 27, 2007

(65) Prior Publication Data

US 2007/0290861 A1    Dec. 20, 2007

Related U.S. Application Data

(60) Continuation of application No. 10/642,910, filed on Aug. 18, 2003, now Pat. No. 7,417,549, which is a division of application No. 09/558,581, filed on Apr. 26, 2000, now Pat. No. 6,806,812.

(51) Int. Cl.
*G08B 13/14* (2006.01)
(52) U.S. Cl. ............... 340/572.7; 340/572.3; 343/747; 343/823; 343/868
(58) Field of Classification Search ........... 340/572.3, 340/572.4, 572.7; 343/723, 745–748, 750, 343/823, 868
See application file for complete search history.

(56) References Cited

U.S. PATENT DOCUMENTS

| | | | |
|---|---|---|---|
| 3,155,954 A | 11/1964 | Larrick et al. | |
| 3,810,147 A | 5/1974 | Lichtblau | |
| 3,955,201 A | 5/1976 | Crump | |
| 3,967,202 A | 6/1976 | Batz | |

(Continued)

FOREIGN PATENT DOCUMENTS

WO    WO98/05171    2/1998

OTHER PUBLICATIONS

O'Toole; James E. et al., U.S. Appl. No. 60/017,900, filed May 13, 1996.

(Continued)

*Primary Examiner*—Eric M Blount
(74) *Attorney, Agent, or Firm*—Lerner, David, Littenberg,Krumholz & Mentlik, LLP (57) ABSTRACT

A radio frequency communication device and method are disclosed. In one aspect, an RFID tag includes an adjustable antenna having a main segment and one or more additional segments that are short relative to the main segment; and the antenna is adjustable to electrically isolate one or more of the additional segments from the main segment. In another aspect, an RFID tag includes an antenna having a first section and a second section short relative to the first section; and the antenna is adjustable to disconnect the first and second sections from each other at a predetermined location. In a further aspect, an RFID tag includes an antenna having a first section and a second section; and the first section is adjustable to decrease the first length of the first section and the second section adjustable to increase the second length of the second section.

41 Claims, 4 Drawing Sheets

U.S. PATENT DOCUMENTS

| | | | |
|---|---|---|---|
| 4,021,705 A | 5/1977 | Lichtblau | |
| 4,048,564 A | 9/1977 | Gleeson, Jr. | |
| 4,075,632 A | 2/1978 | Baldwin et al. | |
| 4,167,010 A | 9/1979 | Kerr | |
| 4,215,341 A | 7/1980 | Cole | |
| 4,470,047 A | 9/1984 | Vogt | |
| 4,486,723 A | 12/1984 | Lysobey | |
| 4,498,076 A | 2/1985 | Lichtblau | |
| 4,560,445 A | 12/1985 | Hoover et al. | |
| 4,572,976 A | 2/1986 | Fockens | |
| 4,694,283 A | 9/1987 | Reeb | |
| 4,724,427 A | 2/1988 | Carroll | |
| 4,780,724 A | 10/1988 | Sharma et al. | |
| 4,782,342 A | 11/1988 | Walton | |
| 4,822,990 A | 4/1989 | Tamada et al. | |
| 4,825,220 A | 4/1989 | Edward | |
| 4,827,395 A | 5/1989 | Anders et al. | |
| 4,854,328 A | 8/1989 | Pollack | |
| 4,856,082 A | 8/1989 | Kasa | |
| 4,857,893 A | 8/1989 | Carroll | |
| 4,862,160 A | 8/1989 | Ekchian et al. | |
| 4,870,419 A | 9/1989 | Baldwin et al. | |
| 4,888,591 A | 12/1989 | Landt et al. | |
| 4,890,072 A | 12/1989 | Espe et al. | |
| 4,912,471 A | 3/1990 | Tyburski et al. | |
| 4,924,238 A | 5/1990 | Ploussios | |
| 4,926,182 A | 5/1990 | Ohta et al. | |
| 4,952,928 A | 8/1990 | Carroll et al. | |
| 4,999,636 A | 3/1991 | Landt et al. | |
| 5,030,807 A | 7/1991 | Landt et al. | |
| 5,055,968 A | 10/1991 | Nishi et al. | |
| 5,081,445 A | 1/1992 | Gill et al. | |
| 5,086,290 A | 2/1992 | Murray | |
| 5,086,389 A | 2/1992 | Hassett et al. | |
| 5,103,209 A | 4/1992 | Lizzi et al. | |
| 5,103,222 A | 4/1992 | Hogen Esch et al. | |
| 5,119,070 A | 6/1992 | Matsumoto | |
| 5,134,085 A | 7/1992 | Gilgen et al. | |
| 5,144,314 A | 9/1992 | Malmberg et al. | |
| 5,164,985 A | 11/1992 | Nysen et al. | |
| 5,175,774 A | 12/1992 | Truax et al. | |
| 5,187,488 A | 2/1993 | Van Der Vis | |
| 5,272,367 A | 12/1993 | Dennison et al. | |
| 5,280,643 A | 1/1994 | Ishii | |
| 5,287,112 A | 2/1994 | Schuermann | |
| 5,299,264 A | 3/1994 | Schotz et al. | |
| 5,300,875 A | 4/1994 | Tuttle | |
| 5,323,150 A | 6/1994 | Tuttle | |
| 5,337,063 A | 8/1994 | Takahira | |
| 5,350,710 A | 9/1994 | Hong et al. | |
| 5,365,551 A | 11/1994 | Snodgrass et al. | |
| 5,374,930 A | 12/1994 | Schuermann | |
| 5,384,284 A | 1/1995 | Doan et al. | |
| 5,406,263 A | 4/1995 | Tuttle | |
| 5,408,690 A | 4/1995 | Ishikawa et al. | |
| 5,420,596 A | 5/1995 | Burrell et al. | |
| 5,420,757 A | 5/1995 | Eberhardt et al. | |
| 5,432,027 A | 7/1995 | Tuttle et al. | |
| 5,448,110 A | 9/1995 | Tuttle et al. | |
| 5,448,242 A | 9/1995 | Sharpe et al. | |
| 5,461,385 A | 10/1995 | Armstrong | |
| 5,471,212 A | 11/1995 | Sharpe et al. | |
| 5,479,172 A | 12/1995 | Smith et al. | |
| 5,480,834 A | 1/1996 | Lake et al. | |
| 5,483,827 A | 1/1996 | Kulka et al. | |
| 5,489,546 A | 2/1996 | Ahmad et al. | |
| 5,491,484 A | 2/1996 | Schuermann | |
| 5,491,715 A | 2/1996 | Flaxl | |
| 5,494,495 A | 2/1996 | Tuttle | |
| 5,495,260 A | 2/1996 | Couture | |
| 5,497,140 A | 3/1996 | Tuttle | |
| 5,500,650 A | 3/1996 | Snodgrass et al. | |
| 5,521,600 A | 5/1996 | McEwan | |
| 5,525,993 A | 6/1996 | Pobanz et al. | |
| 5,532,707 A | 7/1996 | Klinger | |
| 5,564,086 A | 10/1996 | Cygan et al. | |
| 5,566,441 A | 10/1996 | Marsh et al. | |
| 5,572,226 A | 11/1996 | Tuttle | |
| 5,574,470 A | 11/1996 | de Vall | |
| 5,579,017 A | 11/1996 | Smith | |
| 5,608,380 A | 3/1997 | Hogen Esch | |
| 5,621,412 A | 4/1997 | Sharpe et al. | |
| 5,626,630 A | 5/1997 | Markowitz | |
| 5,649,296 A | 7/1997 | MacLellan et al. | |
| 5,668,560 A | 9/1997 | Evans et al. | |
| 5,751,629 A | 5/1998 | Nova et al. | |
| 5,771,021 A | 6/1998 | Veghte et al. | |
| 5,777,581 A | 7/1998 | Lilly et al. | |
| 5,784,687 A | 7/1998 | Itoh et al. | |
| 5,822,714 A | 10/1998 | Cato | |
| 5,861,809 A | 1/1999 | Eckstein et al. | |
| 5,864,319 A | 1/1999 | Paulus | |
| 5,943,016 A | 8/1999 | Snyder et al. | |
| 5,963,144 A | 10/1999 | Kruest | |
| 5,970,398 A | 10/1999 | Tuttle | |
| 5,983,363 A | 11/1999 | Tuttle et al. | |
| 6,005,519 A | 12/1999 | Burns | |
| 6,005,891 A | 12/1999 | Chadwick et al. | |
| 6,016,062 A | 1/2000 | Nicollian et al. | |
| 6,025,129 A | 2/2000 | Nova et al. | |
| 6,028,564 A | 2/2000 | Duan et al. | |
| 6,045,652 A | 4/2000 | Tuttle et al. | |
| 6,061,025 A | 5/2000 | Jackson et al. | |
| 6,104,311 A * | 8/2000 | Lastinger | 340/10.51 |
| 6,117,745 A | 9/2000 | Krishnan | |
| 6,122,494 A | 9/2000 | Tuttle | |
| 6,130,602 A | 10/2000 | O'Toole et al. | |
| 6,310,579 B1 | 10/2001 | Meredith | |
| 6,396,075 B1 | 5/2002 | Krishnan | |
| 6,437,577 B1 | 8/2002 | Fritzmann et al. | |
| 6,466,131 B1 | 10/2002 | Tuttle | |
| 6,509,837 B1 | 1/2003 | Tuttle | |
| 6,574,454 B1 | 6/2003 | Tuttle | |
| 6,781,508 B2 | 8/2004 | Tuttle | |
| 6,806,812 B1 | 10/2004 | Cathey | |
| 7,253,737 B2 | 8/2007 | Cathey | |
| 7,283,035 B2 | 10/2007 | Tuttle | |
| 7,345,575 B2 | 3/2008 | Tuttle | |
| 7,417,549 B2 | 8/2008 | Cathey | |
| 2007/0075837 A1 | 4/2007 | Tuttle | |
| 2007/0222611 A1 | 9/2007 | Cathey | |
| 2008/0100422 A1 | 5/2008 | Tuttle | |

OTHER PUBLICATIONS

Tuttle, John R., U.S. Appl. No. 60/023,318, filed Jul. 30, 1996.

International Application No. PCT/US1997/013519, International Search Report, Dec. 15, 1997.

International Application No. PCT/US1997/013519, Written Opinion, Sep. 16, 1998.

International Application No. PCT/US1997/013519, International Preliminary Examination Report, Jan. 13, 1999.

Beebe, Paul, "Micron Morning Report," The Idaho Statesman, Jul. 16, 1993.

Fink, Donald et al., "Electronic Engineer's Handbook," McGraw-Hill Book Company, 3rd Edition, Distributed Circuits, §100, p. 8-104, 3 pages, 1989.

Tuttle, John R., "A Low-Power Spread Spectrum CMOS RFID for Radio Identification Applications," Conference Proceedings of RF Expo West, pp. 216-222, Mar. 22, 1994.

Tuttle, John, "Digital RF/ID Enhances GPS," Proceedings of the Second Annual Wireless Symposium, pp. 406-411, Feb. 15, 1994.

Vittoz, Eric et al., "CMOS Analog Integrated Circuits Based on Weak Inversion Operation," IEEE Journal of Solid State Circuits, vol. SC-12, No. 3, pp. 224-231, Jun. 1997.

Mitsubishi Motors Corporation, "Eclipse: Safety and Security," located at http://www.mitsubishi-motors.co.jp.r/products/Eclipse/eclipse_04.html, 1995.

USPTO Transaction History of U.S. Appl. No. 09/558,581, filed Apr. 26, 2000, entitled "Automated Antenna Trim for Transmitting and Receiving Semiconductor Devices," now U.S. Patent No. 6,806,812.

USPTO Transaction History of U.S. Appl. No. 10/642,910, filed Aug. 18, 2003, entitled "Automated Antenna Trim for Transmitting and Receiving Semiconductor Devices."

USPTO Transaction History of U.S. Appl. No. 10/968,424, filed Oct. 18, 2004, entitled "Automated Antenna Trim for Transmitting and Receiving Semiconductor Devices," now U.S. Patent No. 7,253,737.

USPTO Transaction History of U.S. Appl. No. 11/754,841, filed May 29, 2007, entitled "Automated Antenna Trim for Transmitting and Receiving Semiconductor Devices."

* cited by examiner

METHODS AND APPARATUSES FOR RADIO FREQUENCY IDENTIFICATION (RFID) TAGS CONFIGURED TO ALLOW ANTENNA TRIM

CROSS-REFERENCE TO RELATED APPLICATION

This application is a continuation of application Ser. No. 10/642,910, filed Aug. 18, 2003, now U.S. Pat. No. 7,417,549, which is a divisional of application Ser. No. 09/558,581, filed Apr. 26, 2000, now U.S. Pat. No. 6,806,812, issued Oct. 19, 2004. The disclosure of each of the previously referenced U.S. patent applications and patents is hereby incorporated by reference in its entirety,

BACKGROUND OF THE INVENTION

1. Field of the Invention

The present invention relates generally to a method and apparatus for tuning a transmitting and receiving antenna to a resonant frequency. More particularly, the invention discloses an antenna, such as that used in conjunction with a radio frequency identification (RFID) tag, having a plurality of fuses or antifuses, or both, in conjunction therewith. The fuses and antifuses may be initiated to extend or shorten the antenna to tune to a resonant frequency.

2. State of the Art

Radio frequency identification (RFID) technology uses electromagnetic energy as a medium through which to send information. Small radio frequency communication systems, such as a RFID tag, may be affixed to various articles so that the articles may be easily tracked during movement from one point to another, or identified, such as through a sales transaction. Therefore, one may tag objects such as items, animals, and people, to be identified or tracked automatically via a reader. The reader may be connected to a host computer which may additionally contain data related to an object's identification code associated with the RFID tag. Furthermore, an RFID tag conventionally also contains programmed information about an object to which it is attached. Through the use of such information, RFID technology may be used to identify objects automatically and without manual handling operations as is required in most bar code systems. In a conventional RFD tag system, a receiver, a transmitter, an antenna, and memory are implemented. RFD tags, their use and operation are well known in the art.

Additionally, the general structures and methods of fabricating RED tags are well known in the art. RFID tags are enabled to receive, store, and transmit article-identifying data with a remote base station. RFID tags have been implemented using a variety of methodologies to allow a user to perform any number of desired identification functions. For example, RFID tags may comprise read-only or read-write capacity. Additionally, passive RFID tags may be implemented with an internal power source, or without an internal power source, drawing their power from the radio frequency (RF) energy transmitted from the reader. As well RFID tags may be configured to operate at low, medium or high frequencies, depending on the needs for a desired application. U.S. Pat. No. 5,777,581 to Lilly et al. (Jul. 7, 1998) even describes an RF semiconductor circuit which may selectively operate at low, medium and high frequencies by switching between three separate antenna systems.

Figure 1:
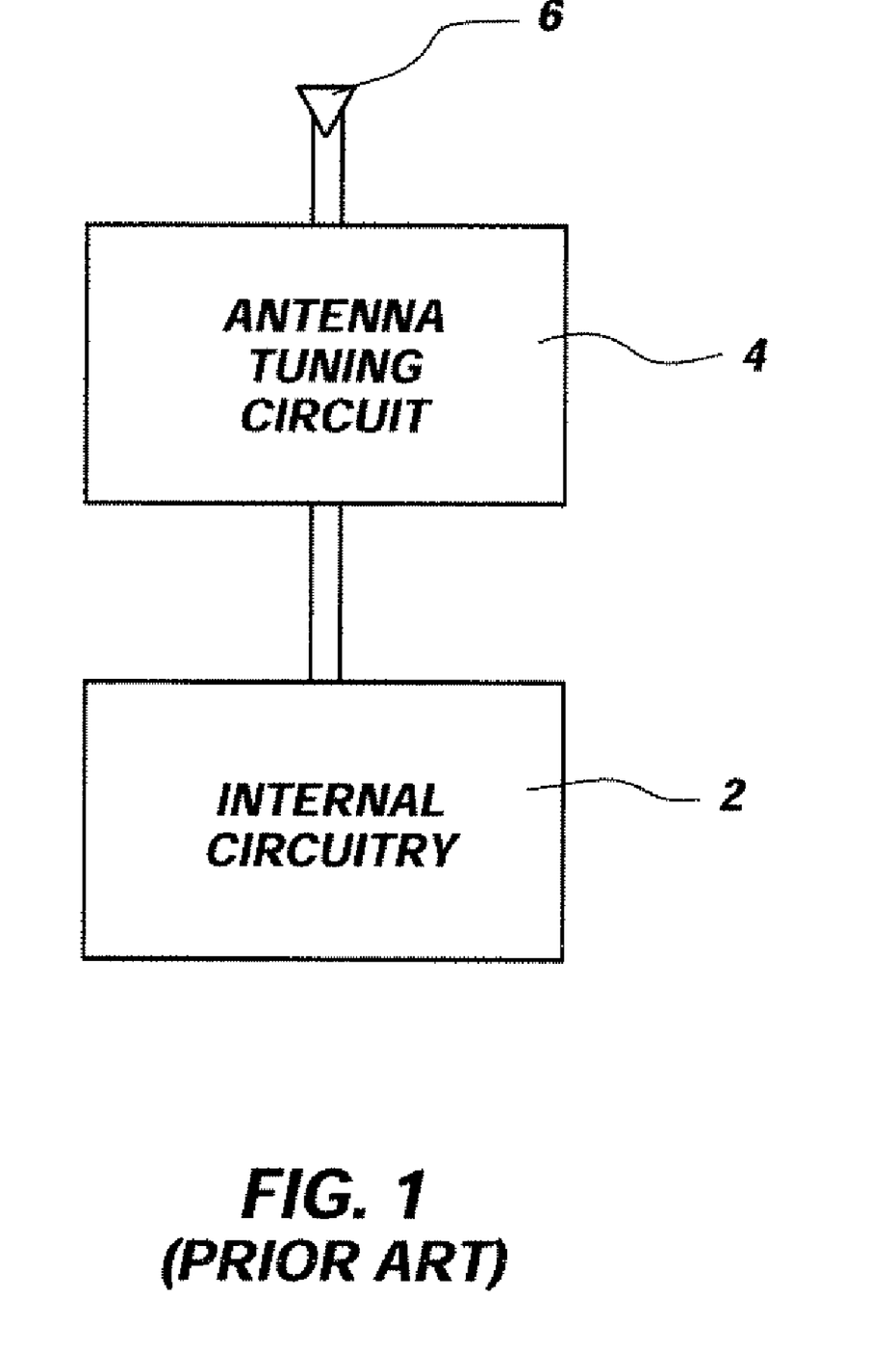
FIG. 1 is a block diagram of a prior art radio frequency identification (RFID) circuit.

To function with a given system, an antenna must be tuned to the internal circuitry and signals transmitted and received by the system. Tuning systems and circuitry for adjusting the internal antenna circuits of REID tags and similar circuitry are also known in the art. As indicated in FIG. 1, conventional RFID antenna tuning systems comprise internal circuitry 2, such as that ordinarily found in an RFID tag, an antenna tuning circuit 4 coupled to the internal circuitry 2, and an antenna 6 coupled to the antenna tuning circuit 4. The antenna tuning circuit 4 conventionally compares a signal characteristic, such as signal frequency or amplitude, of a received signal with a similar or other characteristic of a signal within the internal circuitry 2. By making adjustments to the antenna tuning circuit 4 settings, the RFID circuit may be tuned to a resonant frequency to optimally receive signals from a remote system transmitting to the internal circuitry 2, and optimally transmit the internal circuitry's 2 response. In this way, the received and transmitted signal amplitudes are maximized and, thus, more reliably interpreted by corresponding circuitry.

Adjustments to the antenna tuning circuit 4 may be made by the internal circuitry 2, or by a testing device during a testing process. In making adjustments to the RFID circuit settings to tune to a resonant frequency of a communication system, conventional antenna tuning circuits modify the impedance of the antenna tuning circuit 4 by adjusting a variable capacitive or variable inductive element, or both. Once a modification is made, or coincidental with the adjustment being made, the signal characteristics are again compared and more adjustments made until the resonant frequency settings have been determined. Examples of conventional radio frequency antenna communication systems using various forms of impedance adjustments are shown and described in U.S. Pat. No. 5,970,398 to Tuttle (Oct. 19, 1999), U.S. Pat. No. 5,777,581 to Lilly et al. (Jul. 7, 1998), U.S. Pat. No. 5,491,715 to Flaxl (Feb. 13, 1996), U.S. Pat. No. 5,448,110 to Tuttle et al. (Sep. 5, 1995), U.S. Pat. No. 4,780,724 to Sharma et al. (Oct. 25, 1988), and U.S. Pat. No. 4,486,723 to Lysobey (Dec. 4, 1984), the disclosures of which are hereby incorporated herein by reference.

The internal antenna tuning circuit components, however, undesirably add to the size of the device, particularly in RFID applications where a desire is for a smaller system. Additionally, by interposing capacitive and inductive components between the antenna and the internal circuitry, additional power is consumed in activating those elements, and additional heat is produced. Furthermore, radio frequency communication devices operating at higher frequencies (several hundred megahertz) are difficult to tune using variable circuit impedance elements such as inductors and capacitors. It is therefore desirable to have a small radio frequency transponder circuit, such as that used in RFID tags, which does not require an additional internal antenna tuning circuit so the overall system can consume less power, produce less heat and use less space.

BRIEF SUMMARY OF THE INVENTION

Some embodiments are summarized in this section. In one aspect, an RFID tag includes an adjustable antenna having a main segment and one or more additional segments that are short relative to the main segment; and the antenna is adjustable to electrically isolate one or more of the additional segments from the main segment. In another aspect, an RFID tag includes an antenna having a first section and a second section short relative to the first section; and the antenna is adjustable to disconnect the first and second sections from each other at a predetermined location. In a further aspect, an RFID tag includes an antenna having a first section and a second section; and the first section is adjustable to decrease the first length of the first section and the second section adjustable to increase the second length of the second section.

The present invention provides a method and apparatus for tuning a radio frequency antenna, such as that used in radio frequency identification (RFID) tags, to a semiconductor circuit using additional antenna segments coupled to the antenna by fuses and antifuses. According to a first embodiment of the invention, at least one antenna for a RFID tag is disclosed. The antenna comprises a main antenna portion, a plurality of antenna portions, each coupled to the main antenna portion by a fuse, and a plurality of antenna portions, each separated from the main antenna portion by an antifuse. A method of the present invention uses a testing device having probe hardware, software and antenna tuning hardware to test one of the responses of the antenna to a test signal and a signal transmitted from the RFID tag. Based upon the response of the antenna, the testing device may initiate a connect or disconnect operation to attach an additional antenna segment through an antifuse if the antenna is determined to be too short, or detach an antenna segment through a fuse if the antenna is determined to be too long. Alternatively, the testing device may do nothing if the antenna responds within specifications. Additionally, if the testing device determines that the antenna response is not within specifications but cannot determine whether the antenna is too long or too short, a method of the present invention has the testing device initiating either a fuse blow operation or an antifuse connect operation and then retests the antenna system to evaluate whether the antenna response improved or became worse as a result of the change. Further testing is based upon the response of the modified antenna. If all of the fuses have been blown, or all of the antifuses have been connected and the antenna still does not operate within specifications, the RFID tag is rejected. The antenna segments attached to the main antenna through fuses and antifuses may be attached in series or in parallel, though series connection is most preferred.

A second embodiment of the invention discloses an RFID tag having internal circuitry, a main antenna and a plurality of antenna segments, each coupled in series to the main antenna through a fuse. The antenna system may be intentionally fabricated such that at least one fused segment needs to be detached for the antenna to operate within specifications. A method of the present invention of testing the RFID tag includes testing the antenna using a testing device such that an antenna response is measured and a fuse is blown if the antenna is determined to be too long or out of specification limits.

A third embodiment of the invention discloses an RFID tag having internal circuitry, a main antenna and a plurality of antenna segments, each attachable to the main antenna in series through an antifuse. The antenna system may be intentionally fabricated such that at least one antifused segment needs to be attached for the antenna to operate within specifications. A method of the present invention of testing the RFID tag includes testing the antenna using a testing device such that an antenna response is measured and an antifuse is connected if the antenna is determined to be too short or out of specification limits.

A radio frequency communication system is disclosed comprising a processor, a memory device an input, an output and a storage device, a transceiver and a plurality of RFID tags, each having internal circuitry, a main antenna and a plurality of antenna segments, each associated with the main antenna by at least one of a fuse and an antifuse.

BRIEF DESCRIPTION OF THE SEVERAL VIEWS OF THE DRAWINGS

The nature of the present invention as well as other embodiments of the present invention may be more clearly understood by reference to the following detailed description of the invention, to the appended claims, and to several drawings herein, wherein;

DETAILED DESCRIPTION OF THE INVENTION

Figure 2:
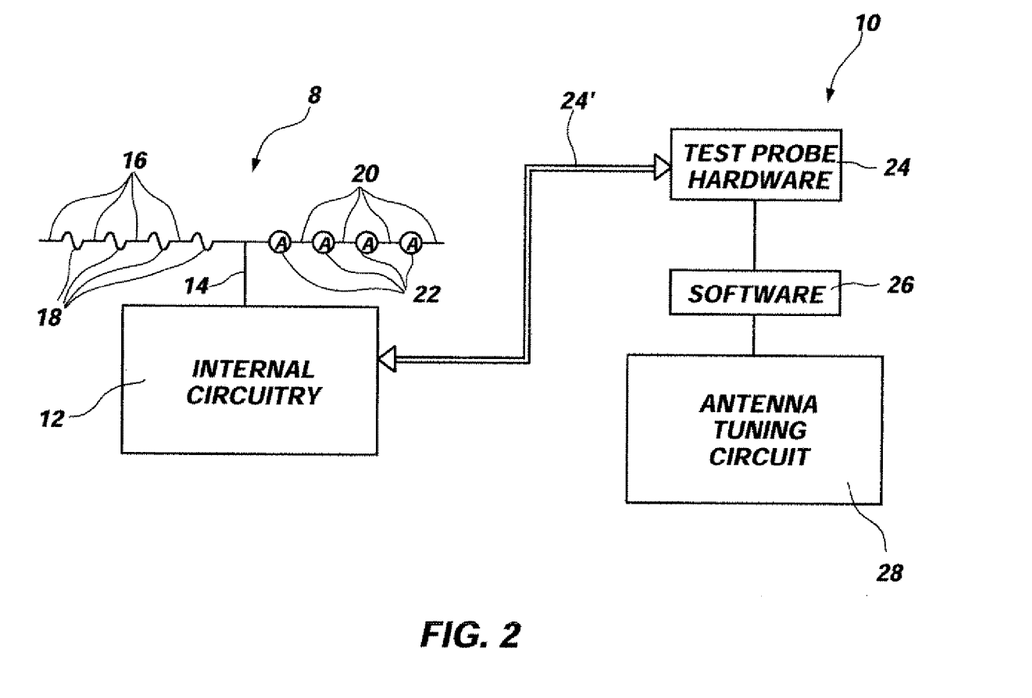
FIG. 2 is a block diagram of a RFID circuit according to a first embodiment of the present invention and a testing device.

Shown in FIG. 2 is a block diagram of a radio frequency identification (RFID) tag circuit 8 coupled to a testing device 10 according to a first embodiment of the present invention. The RFID tag circuit 8 comprises internal circuitry 12, a main antenna 14, a plurality of antenna segments 16 coupled to the main antenna 14 in series through fuses 18, and a plurality of antenna segments 20 coupleable to the main antenna in series through antifuses 22. The internal circuitry 12 of the RFID tag circuit 8 may be one of many well known RFID tag or patch circuits known in the art such as that disclosed in U.S. Pat. No. 5,448,110 to Tuttle et al. (Sep. 5, 1995) (including a wake-up circuit, receiver, transmitter, control logic, memory and one or more batteries), or that disclosed in U.S. Pat. No. 5,497,140 to Tuttle (May 5, 1996) (including a sleep/wake-up circuit, receiver, transmitter, control logic, memory and no batteries). One of ordinary skill in the art will readily understand how to adapt the principles of the present invention to any radio frequency communication device known in the art.

Also shown in FIG. 2 is a testing device 10 comprising test probe hardware 24, software 26, and antenna tuning hardware 28. The test probe hardware 24 includes a probe 30 for coupling to the RFID tag circuit 8. Conventionally, a RFID tag circuit is tested prior to its initial use, and preferably after final packaging, to ensure that the antenna 14 of the circuit 8 is in tune with the internal circuitry. To do this, a testing device 10 measures the antenna 14 response to various incoming and outgoing signals with respect to the internal circuitry. Conventionally, if it is determined that the antenna would respond more optimally with more or less impedance, a value of a variable inductor or capacitor is respectively increased or decreased to optimize the antenna tuning, or match the impedance of the antenna to the system. Such testing and tuning circuit adjustment devices and methods are well known to one of ordinary skill in the art.

According to this first embodiment of the present invention, rather than using variable capacitors or inductors to adjust the antenna response to signals, antenna segments 16 and 20 are associated with the main antenna 14 through antifuses 22 or fuses 18. Because the testing sequence is primarily controlled through test software 26, a software programmer of ordinary skill in the art may readily modify the software 26 to blow a fuse 18 or initiate an antifuse 22, rather than increase or decrease the inductance or capacitance of an antenna impedance matching circuit, in response to an antenna test. By removing a portion of an antenna coupled to the main antenna through detaching an antenna segment 16 by blowing a fuse 18, the impedance of the antenna is decreased. By adding a portion of an antenna to the main antenna through attaching an antenna segment 20 by initiating an antifuse 22, the impedance of the antenna is increased.

The fuses used for the antenna may be any of those commonly known in the art including, but not limited to, electrically-blown or laser-blown fuses, and may be fabricated on a semiconductor substrate, such as a VLSI fuse, or on a film, such as a RFID package overlay. It is believed that one of ordinary skill in the art will understand how to fabricate antenna segments 16 coupled to a main antenna 14 through fuses 18. Antifuses 22, their use and fabrication are similarly well known in the art.

It should be noted that drastic adjustments in the overall antenna layout and arrangement caused by adding or removing antenna segments 16 and 20 may affect the distribution and reception pattern of the antenna 14. It is preferred that the antenna segments 16 and 20 be relatively short with respect to the overall length of the antenna 14, and that the segments 16 and 20 follow the general layout of the man antenna 14. Each antenna layout and desired application is different, however, and one of ordinary skill in the an will readily be able to incorporate additions or subtractions of antenna segments 16 and 20 into an existing antenna scheme.

Figure 3:
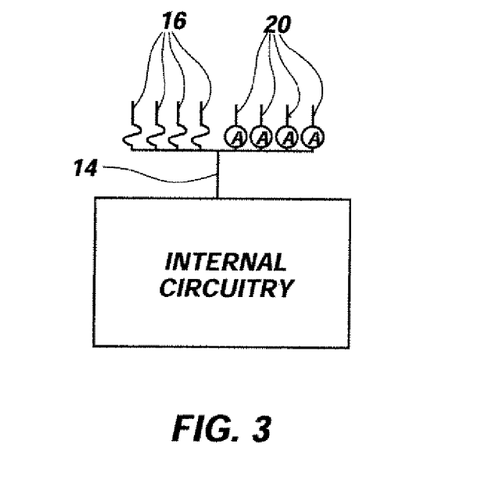
FIG. 3 is a block diagram of a RFID circuit depicting antenna segments coupled to a main antenna in parallel.
Figure 4:
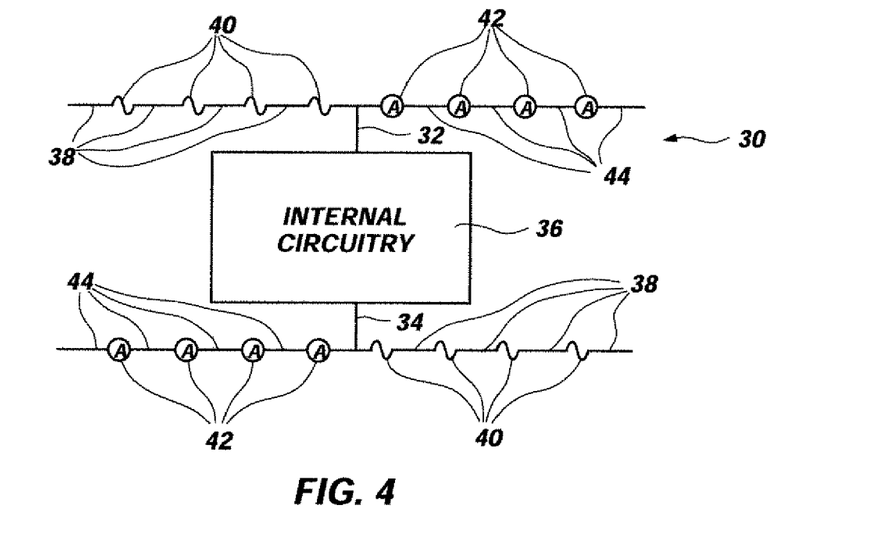
FIG. 4 is a block diagram of a RFID circuit depicting two main antennas, each having antenna segments coupled thereto.

As shown in FIG. 3, rather than associating the antenna segments 16 and 20 with the main antenna 14 in series through fuses 18 and antifuses 22 as shown in FIG. 4, antenna segments 24 and 26 may be associated with a main antenna 28 in parallel, though series association is most preferred. As shown in FIG. 4, an RFID tag 30 may have more than one main antenna 32 and 34 coupled to the internal circuitry 36. It is contemplated, however, that each main antenna 32 and 34 may have segments 38 and 44 associated therewith through fuses 40 or antifuses 42, or both.

Figure 5:
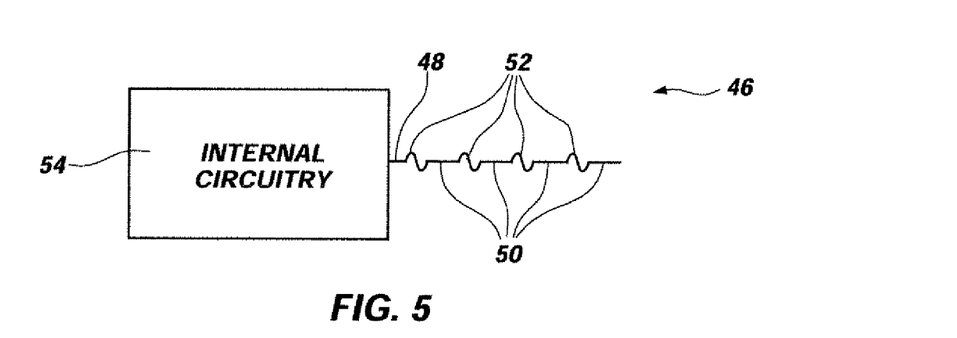
FIG. 5 is a block diagram of a RFID circuit according to a second embodiment of the present invention.

Shown in FIG. 5 is a block diagram of a RFID circuit 46 according to a second embodiment of the present invention. According to this second embodiment, RFID circuit 46 includes a plurality of antenna segments 50 coupled in series to a main antenna 48. The combination of the main antenna 48 and fused antenna segments 50 may be intentionally designed and fabricated to be longer than needed to tune to the internal circuitry 54 so that at least one fuse 52 will need to be blown during a testing operation. In this way, antifuses which lengthen the main antenna 48 by coupling antenna segments to the main antenna 48 will not be needed. In a testing operation, the RFID circuit 46 is tested and the antenna response monitored. If the antenna response, as interpreted by a testing device, indicates that the antenna 48 is too long, a fuse 52 farthest from the main antenna 48 in the series is blown and the testing operation repeated with a second, third, etc. fuse being blown as needed until the antenna response is within antenna specifications. If the antenna response, as interpreted by the testing device, indicates that the antenna 48 is too short, or after all the fuses 52 are blown, the antenna 48 is still too long, the RFID circuit 46 is rejected for use in its present application.

Figure 6:
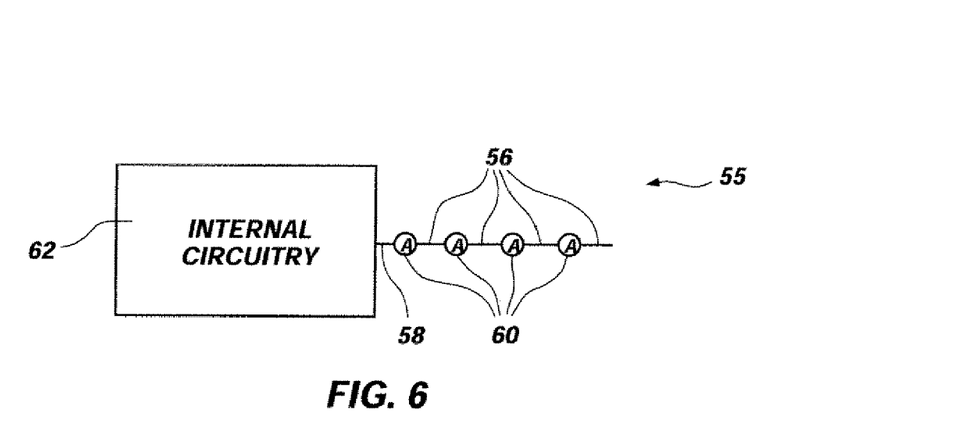
FIG. 6 is a block diagram of a RFID circuit according to a third embodiment of the present invention.

Shown in FIG. 6 is a block diagram of a RFID circuit according to a third embodiment of the present invention. According to this third embodiment, a REID circuit 55 includes a plurality of antenna segments 56 associated in series with a main antenna 58. The main antenna 58 may be intentionally designed to be shorter than needed to tune the internal circuitry 62 so that at least one antifuse 60 will need to be initiated during a testing sequence. In this way, fuses which shorten the main antenna 58 by decoupling antenna segments from the main antenna 58 will not be needed. In a testing operation, the RFID circuit 55 is tested and the antenna response monitored. If the antenna response, as interpreted by a testing device, indicates that the antenna 58 is too short, a first antifuse 60 closest to the main antenna 58 is initiated and the testing operation repeated with a second, third, etc. antifuse being initiated as needed until the antenna response is within antenna specifications. If the antenna response, as interpreted by the testing device, indicates that the antenna 58 is too long, or after all the antifuses 60 have been initiated, the antenna 58 is still too short, the RFID circuit 55 is rejected for use in its present application.

Figure 7:
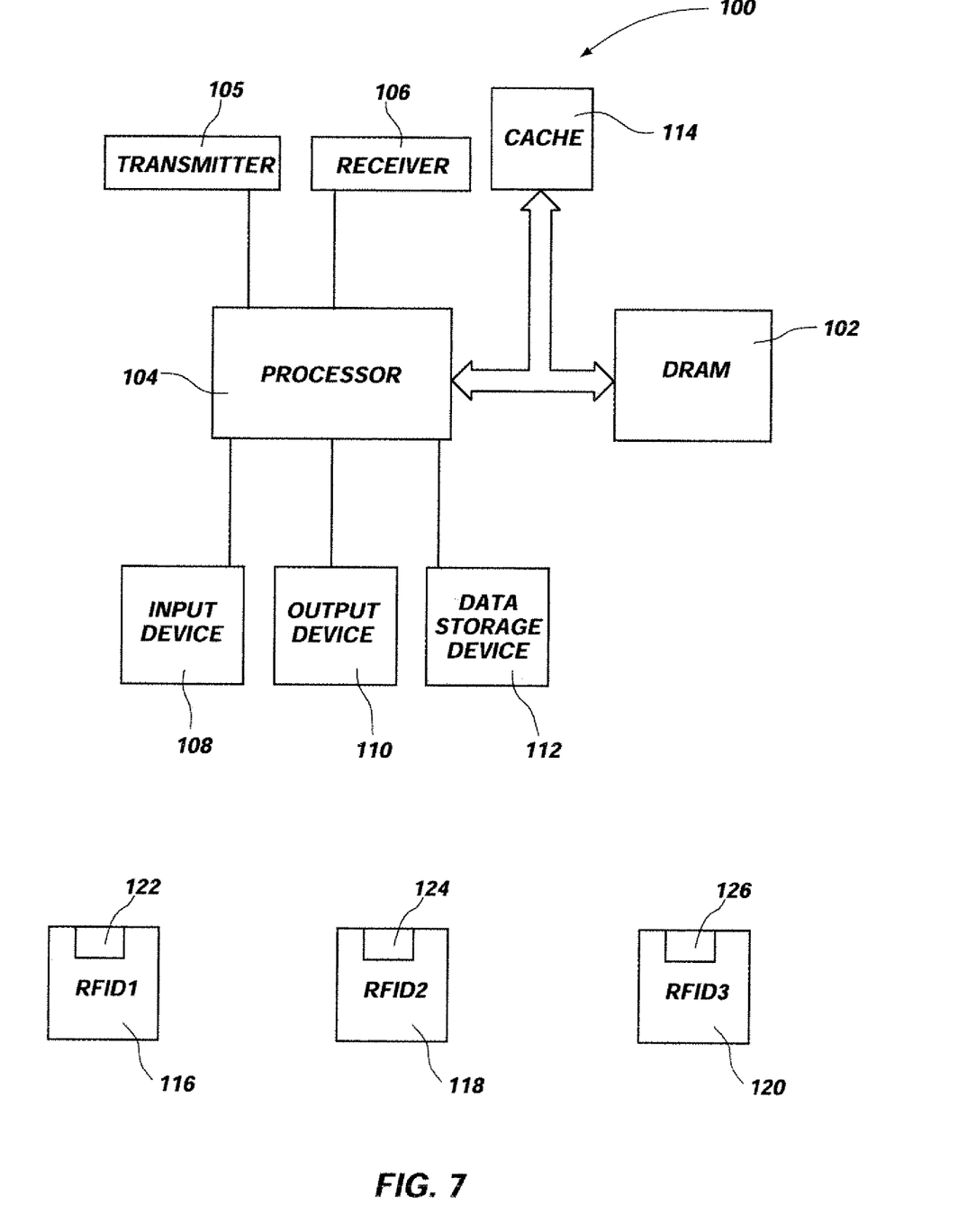
FIG. 7 is a block diagram of a radio frequency communication system.

Shown in FIG. 7 is a block diagram of a radio frequency communication system 100 including RFID tags 116, 118 and 120, each having an antenna 122, 124 and 126 comprising a main antenna and antenna segments associated with the main antenna according to one or more embodiments of the present invention. The radio frequency communication system 100 includes a processor 104 for performing various computing functions, such as executing specific software to perform specific calculations or tasks and coordinate identification information. Additionally, the radio frequency communication system 100 includes one or more transmitters 105 and receivers 106 to send and receive information from the RFID tags 116, 118 and 120 to the processor 104. The radio frequency communication system 100 also includes one or more input devices 108, such as a keyboard or a mouse, coupled to the processor 104 to allow an operator to interface with the radio frequency communication system 100. The radio frequency communication system 100 also includes one or more output devices 110 coupled to the processor 104, such output devices including such outputs as a printer, a video terminal or a network connection. One or more data storage devices 112 are also conventionally coupled to the processor 104 to store or retrieve data from external storage media. Examples of conventional storage devices 112 include hard and floppy disks, tape cassettes, and compact disks. The processor 104 is also conventionally coupled to a cache memory 14, which is usually static random access memory ("SRAM"), and to DRAM 102.

Though depicted as dipole or linear antennas in the various embodiments herein, it will be understood by one of ordinary skill in the art that the principles of this invention may be readily applied to any antenna or antenna array configuration, such as a loop, coil or a bowtie antenna. Furthermore, though a particular number of antenna segments may have been shown as illustrative of the present invention, it will be understood by one of ordinary skill in the art that any number of antenna segments, and antenna segments of varying sizes, may be associated with a main antenna through fuses and antifuses. One of ordinary skill in the art may readily adapt the principles of the present invention to a particular RFID architecture, layout and application. Additionally, as will be clear to one of ordinary skill in the art, because antennas in the art are formed in embodiments on a semiconductor substrate, and in embodiments off the semiconductor substrate but in electrical contact with the substrate, and fuses and antifuses may be formed either on or off of a semiconductor substrate, the present invention may readily be formed on or off of a semiconductor substrate.

By adjusting the tuning of an RFID circuit antenna through adjusting the length of the antenna rather than adjusting the values of capacitive and inductive components attached to the antenna, less power is consumed, less heat is produced and devices operating at higher frequencies are more easily tuned.

Although the present invention has been shown and described with reference to a particular preferred embodiment, various additions, deletions and modifications that are obvious to a person skilled in the art to which the invention pertains, even if not shown or specifically described herein, are deemed to lie within the scope of the invention as encompassed by the following claims.

What is claimed is:

1. A radio frequency identification (RFID) tag comprising:
    communications circuitry; and
    an adjustable antenna coupled to the communications circuitry, the antenna having a main segment and one or more additional segments, at least one of the one or more additional segments being short relative to the main segment to follow a layout of the main segment, the antenna being adjustable to electrically isolate one or more of the one or more additional segments from the main segment.

2. The RFID tag of claim 1, wherein the one or more of the one or more additional segments are configured to be electrically isolated through the use of an electrical current.

3. The RFID tag of claim 1, wherein the one or more of the one or more additional segments are configured to be electrically isolated through the use of a fuse.

4. A radio frequency identification (RFID) tag comprising:
    a first section of an antenna having a layout;
    a second section of the antenna, the second section of the antenna being short relative to the first section of the antenna to follow the layout, the antenna being adjustable to disconnect the first section and the second section from each other at a predetermine location; and
    an integrated circuit electrically coupled to the antenna.

5. The RFID tag of claim 4, wherein at least one fuse is located between the second section and the first section.

6. The RFID tag of claim 5, wherein the second section comprises one or more additional segments and one or more antifuses located between each of the one or more additional segments and the first section.

7. The RFID tag of claim 4, wherein the second section comprises one or more additional segments connected in series.

8. The RFID tag of claim 4, wherein the second section comprises one or more additional segments connected in parallel.

9. A radio frequency identification (RFID) tag comprising:
    an integrated circuit; and
    an antenna electrically coupled to the integrated circuit, the antenna having a first section and a second section, the first section being electrically adjustable to decrease a first length of the first section, the second section being electrically adjustable to increase a second length of the second section.

10. The RFID tag of claim 9, wherein the first section comprises one or more segments interconnected via one or more fuses.

11. The RFID tag of claim 10, wherein the one or more segments are electrically coupled to a main section of the antenna in parallel.

12. The RFID tag of claim 10, wherein the one or more segments are electrically coupled to a main section of the antenna in series.

13. The RFID tag of claim 9, wherein the second section comprises one or more segments interconnected via one or more antifuses.

14. The RFID tag of claim 13, wherein the one or more segments are electrically coupled to a main section of the antenna in parallel.

15. The RFID tag of claim 13, wherein the one or more segments are electrically coupled to a main section of the antenna in series.

16. A method of forming a radio frequency identification (RFID) tag, the method comprising:
    providing a substrate; and
    providing an antenna on the substrate, the antenna comprising one or more fuses.

17. The method of claim 16, wherein the antenna includes one or more sections connected in parallel via the one or more fuses.

18. The method of claim 16, wherein the antenna includes one or more sections connected in series via the one or more fuses.

19. A method of forming a radio frequency identification (RFID) tag, the method
    comprising:
    providing a substrate; and
    providing an antenna on the substrate, the antenna comprising one or more antifuses.

20. The method of claim 19, wherein the antenna includes one or more sections connected in parallel via the one or more antifuses.

21. The method of claim 19, wherein the antenna includes one or more sections connected in series via the one or more antifuses.

22. A radio frequency identification (RFID) tag, comprising:
    a memory to store an identification code identifying an object to which the RFID tag is attached;
    a controller coupled with the memory;
    a receiver coupled with the controller to receive wireless radio frequency interrogation signals from a reader;
    a transmitter coupled with the controller to send the identification code, via wireless radio frequency signals, in response to the interrogation signals from the reader; and
    an antenna coupled with at least one of the receiver and the transmitter, the antenna having:
        a first section having a layout, and
        a second section, the second section of the antenna being short relative to the first section of the antenna and following the layout of the first section of the antenna, the antenna being adjustable to disconnect the first section and the second section from each other at a predetermine location.

23. The RFID tag of claim 22, wherein the antenna has at least one element, selected from the group consisting of a fuse and an antifuse, at the predetermined location.

24. The RFID tag of claim 22, wherein the antenna comprises at least one of a dipole antenna, a loop antenna, and a coil antenna.

25. The RFID tag of claim 22, wherein RFID tag further comprises a wake-up circuit.

26. The RFID tag of claim 22, wherein the RFID tag is configured to operate using power drawn from radio frequency (RF) energy transmitted from the reader.

27. The RFID tag of claim 22, wherein the RFID tag is a passive RFID tag.

28. A radio frequency identification (RFID) system, comprising:
  a processor;
  at least one transmitter coupled to the processor to wirelessly provide radio frequency (RF) energy and interrogation signals;
  at least one receiver coupled to the processor to receive responses to the interrogation signals;
  a plurality of RFID tags attached to a plurality of objects, each of the RFID tags comprising:
    an antenna having a first section and a second section, the second section of the antenna being short relative to the first section of the antenna to follow a layout of the first section of the antenna, the antenna being adjustable to disconnect the first section and the second section from each other at a predetermine location;
    a memory storing an identifier indentifying a respective object;
    a controller coupled with the memory;
    a receiver coupled with the antenna and the controller to receive the interrogation signals; and
    a transmitter coupled with the antenna and the controller to transmit the identifier to the reader in accordance with the interrogation signals.

29. The system of claim 28, wherein the antenna has at least one element, selected from the group consisting of a fuse and an antifuse, at the predetermined location.

30. The system of claim 28, wherein each of the RFID tags is configured to operate using power drawn from the RF energy transmitted by the at least one transmitter.

31. The system of claim 28, wherein the antenna is selected from a group consisting of a dipole antenna, a loop antenna, and a coil antenna.

32. A method, comprising:
  providing a radio frequency identification (RFID) tag having an antenna, the antenna comprising a first section and a second section, the second section of the antenna being short relative to the first section of the antenna to follow a layout of the first section of the antenna, the antenna being adjustable to disconnect the first section and the second section from each other at a predetermine location; and
  adjusting the antenna to disconnect the first section and the second section from each other at the predetermine location.

33. The method of claim 32, wherein the antenna comprise a fuse at the predetermined location; and the adjusting comprises blowing the fuse.

34. The method of claim 32, further comprising:
  attaching the RFID tag to an object, wherein the RFID tag comprises a memory to store an identification code to identify the object.

35. The method of claim 34, further comprising:
  interrogating the RFID tag via wireless radio frequency (RF) signals, wherein the RFID tag comprises a receiver to receive the RF signals and a transmitter to provide the identification code in accordance with the RF signals; and
  wherein the interrogating comprises providing radio frequency energy to power the RFID tag.

36. The method of claim 32, wherein the adjusting is to tune the antenna to a resonant frequency.

37. A method, comprising:
  transmitting wireless radio frequency interrogation signals from a reader to a radio frequency identification (RFID) tag attached to an object, the RFID tag storing an identifier of the object, the RFID tag having an antenna comprising a first section and a second section, the second section of the antenna being short relative to the first section of the antenna to follow a layout of the first section of the antenna, the antenna being adjustable to disconnect the first section and the second section from each other at a predetermine location, the RFID further having a receiver to receive the interrogation signals and a transmitter to provide the identifier according to the interrogation signals;
  receiving the identifier from the RFID tag; and
  disconnecting the first section and the second section from each other at the predetermine location.

38. The method of claim 37, wherein the antenna comprise a fuse at the predetermined location; and the disconnecting comprises blowing the fuse.

39. The method of claim 37, further comprising:
  attaching the RFID tag to the object.

40. The method of claim 37, further comprising:
  providing wireless radio frequency energy to power the RFID tag at least during a time period in which the transmitter provides the identifier.

41. The method of claim 37, wherein the disconnecting is to tune the antenna to a resonant frequency.

* * * * *

UNITED STATES PATENT AND TRADEMARK OFFICE
CERTIFICATE OF CORRECTION

| | | |
|---|---|---|
| PATENT NO. | : 7,812,728 B2 | Page 1 of 1 |
| APPLICATION NO. | : 11/845308 | |
| DATED | : October 12, 2010 | |
| INVENTOR(S) | : David A. Cathey | |

It is certified that error appears in the above-identified patent and that said Letters Patent is hereby corrected as shown below:

Column 1, line 31, "a RFID" should read --an RFID--.
Column 1, line 45, "RFD" should read --RFID--.
Column 1, line 48, "RED" should read --RFID--.
Column 1, line 57, "As well" should read --Also,--.
Column 1, line 67, "REID" should read --RFID--.
Column 3, line 9, "a RFID" should read --an RFID--.
Column 4, line 14, "a RFID" should read --an RFID--.
Column 4, line 16, "a RFID" should read --an RFID--.
Column 4, line 18, "a RFID" should read --an RFID--.
Column 4, line 21, "a RFID" should read --an RFID--.
Column 4, line 23, "a RFID" should read --an RFID--.
Column 4, line 51, "a RFID" should read --an RFID--.
Column 5, line 17, "a RFID" should read --an RFID--.
Column 5, line 30, "skill in the an" should read --skill in the art--.
Column 5, line 43, "a RFID" should read --an RFID--.
Column 5, line 65, "a RFID" should read --an RFID--.
Column 5, line 67, "a REID" should read --an RFID--.
Column 7, line 36, "a predetermine" should read --a predetermined--.
Column 8, line 53, "predetermine location" should read --predetermined location--.
Column 8, line 61, after "wherein" insert --the--.
Column 9, line 16, "predetermine" should read --predetermined--.
Column 9, line 42, "predetermine" should read --predetermined--.
Column 9, line 45, "predetermine" should read --predetermined--.
Column 10, line 1, "comprise" should read --comprises--.
Column 10, line 28, "predetermine" should read --predetermined--.
Column 10, line 34, "predetermine" should read --predetermined--.
Column 10, line 35, "comprise" should read --comprises--.

Signed and Sealed this
First Day of November, 2011

David J. Kappos
*Director of the United States Patent and Trademark Office*